United States Patent [19]

Clas et al.

[11] 3,917,550

[45] Nov. 4, 1975

[54] PLASTISOLS CONTAINING BONDING AIDS

[75] Inventors: Wilhelm Clas, Duisburg-Meiderich; Helmut Horstkorte, Monheim-Baumberg, both of Germany

[73] Assignee: Henkel & Cie GmbH, Dusseldorf-Holthausen, Germany

[22] Filed: May 30, 1974

[21] Appl. No.: 474,605

[30] Foreign Application Priority Data
June 1, 1973 Germany............................ 2327958

[52] U.S. Cl....... 260/23 EP; 260/31.8 G; 260/42.49
[51] Int. Cl.².......................................... C08L 27/06
[58] Field of Search ...... 260/31.8 W, 23 EP, 30.4 R

[56] References Cited
UNITED STATES PATENTS

| | | | |
|---|---|---|---|
| 2,960,490 | 11/1960 | Hinkes...................... | 260/31.8 W X |
| 3,365,090 | 1/1968 | Eckert........................ | 260/30.4 R X |

*Primary Examiner*—Lewis T. Jacobs
*Attorney, Agent, or Firm*—Hammond & Littell

[57] ABSTRACT

A plastisol based on PVC and/or copolymers of vinyl chloride and plasticizers as well as fillers and auxiliary materials, characterized by an additional content of a combination of
  a. an imidazole and/or benzimidazole or the salts thereof with weak acids as well as
  b. basic metal stabilizer compounds and
  c. epoxidized plasticizers.

8 Claims, No Drawings

PLASTISOLS CONTAINING BONDING AIDS

THE PRIOR ART

Plastisols based on PVC and plasticizers for PVC are used to a large extent as coating materials for metals and other substrates as well as being used as adhesives. One difficulty in the use of these plastisols is that the metals or other substrates must be prepared for the coating or bonding by expensive cleaning processes. It has been tried, therefore, to improve the adhesion on uncleaned or non-pretreated substrates by using additives to the plastisols themselves. Thus it is known in the prior art to incorporate epoxide compounds and hardeners for epoxide compounds in PVC plastisols. By using these additives, the adhesion is indeed improved, and fairly good adhesion values on metals and other substrates can be obtained in particular when using crystallized triisocyanurate with so-called hot hardeners (high temperature hardeners).

One disadvantage of these known additive epoxide compounds is that the finished mixtures, which contain the hardener in addition to the epoxide compounds, may undergo such a viscosity increase that they are very hard to process during unfavorable storage conditions.

OBJECTS OF THE INVENTION

It is an object of the present invention to provide plastisols which have a long-lasting storage stability and also contain a combination of bonding aids which does not adversely affect the storage properties; moreover the plastisols according to the invention also have as an object to show a firm adhesion on surfaces which were little or practically uncleaned as well as on lacquered surfaces.

It is another object of the present invention to provide a plastisol based on PVC and/or copolymer of vinyl chloride and plasticizers as well as fillers and auxiliary materials, characterized by an additional content of a combination of
  a. an imidazole and/or benzimidazole or the salts thereof with weak acids as well as
  b. basic metal stabilizer compounds and
  c. epoxidized plasticizers.

These and further objects of the invention will become apparent as the description thereof proceeds.

DESCRIPTION OF THE INVENTION

The present invention relates to plastisols based on PVC and/or copolymers of vinyl chloride and plasticizers as well as fillers and possibly pigments or additional auxiliary substances.

The plastisols of the invention contain in addition to the usual ingredients a combination of
  a. an imidazole and/or benzimidazole or their salts with weak acids, as well as
  b. basic metal stabilizer compounds and
  c. epoxidized plasticizers.

Generally the composition of the plastisols according to the invention will be selected such that, based upon the total plastisol, the addition consists of
  a. 0.05 to 3% by weight, preferably 0.1 to 1% by weight of imidazole and/or alkylated or chlorinated imidazoles and/or benzimidazole or their salts with weak acids as well as
  b. 0.2 to 5% by weight, preferably 0.3 to 2% by weight of basic metal stabilizer compounds and
  c. 2 to 30% by weight, preferably 5 to 20% by weight of epoxidized plasticizers or stabilizers.

More particularly the present invention provides a PVC plastisol comprising
  A from 10 to 50% by weight of a plasticizable polymer selected from the group consisting of polyvinyl chloride and copolymers of from 80 to 100% by weight of vinyl chloride and from 0 to 20% by weight of ethylenically-unsaturated monomers copolymerizable with vinyl chloride,
  B. from 6 to 60% by weight of a plasticizer for polyvinyl chloride, with the proviso that said plasticizer component contains from 2 to 30% by weight of the plastisol of a plasticizer for polyvinyl chloride containing at least one vicinal epoxide group, wherein the ratio of component A to component B is from 1:0 to 1:2,
  c. from 0.05 to 3.0% by weight of a member selected from the group consisting of imidazole, alkylated imidazoles, chlorinated imidazoles, benzimidazole, an acid addition salt of said imidazoles with a weak acid, an acid addition salt of benzimidazole with a weak acid, and the mixtures thereof,
  D. from 0.2 to 5% by weight of a basic metal stabilizer compound, and
  E. from 0 to 70% by weight of inert materials selected from the group consisting of inorganic fillers and mineral pigments.

Specifically the above-described plastisol contains an imidazole compound selected from the group consisting of

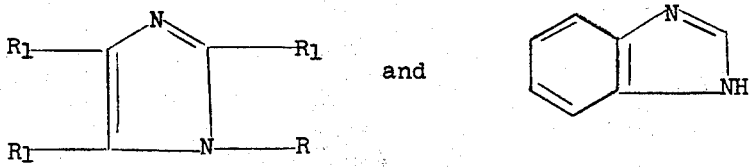 and wherein R is selected from the group consisting of hydrogen, alkyl having 1 to 18 carbon atoms, alkenyl having 2 to 18 carbon atoms, cycloalkyl having 5 to 7 carbon atoms and phenyl, and $R_1$ is selected from the group consisting of R and chlorine, and acid addition salts thereof with a weak acid.

The present invention also provides an improvement in the process for producing a coated article which comprises applying a PVC plastisol to a substrate, heating said coated substrate to a temperature and for a time effective to gel said plastisol and to produce said coated article, and recovering said coated article; wherein the improvement comprises utilizing the plastisol of the invention as said PVC plastisol.

The present invention also provides an improvement in a PVC plastisol comprising
  A. a plasticizable polymer selected from the group consisting of polyvinyl chloride and copolymers of from 80 to 100% by weight of vinyl chloride and from 0 to 20% by weight of ethylenically-unsaturated monomers copolymerizable with vinyl chloride,
  B. an effective amount of plasticizer for polyvinyl chloride, and optionally C. inert materials selected from the group consisting of inorganic fillers and mineral pigments; wherein the improvement comprises utilizing in (B) as said effective amount of a plasticizer for polyvinyl chloride, from 6 to 60% by weight of a plasticizer for polyvinyl chloride, with the proviso that said plasticizer component contains from 2 to 30% by weight of the plastisol of a plasticizer for polyvinyl chloride containing at least one vicinal epoxide group, wherein the ratio of component A to component B is from 1:0.6 to 1:2, further in combination with D. from 0.05 to 3.0% by weight of a member selected from the group consisting of imidazole, alkylated imidazoles, chlorinated imidazoles, benzimidazole, an acid addition salt of said imidazoles with a weak acid, an acid addition salt of benzimidazole with a weak acid, and the mixtures thereof, and E. from 0.2 to 5% by weight of a basic metal stabilizer compound.

The plastisols of the present invention have the advantages of possessing a long-lasting storage stability and also contain a combination of bonding aids which does not adversely effect the storage properties. Moreover, the plastisols according to the invention also show a firm adhesion on surfaces which were little or practically uncleaned as well as on lacquered surfaces.

In addition to imidazole and/or benzimidazole, it is also possible to us derivatives of imidazole which contain substitutents for the plastisols of the invention. Specifically therefore the plastisols of the invention contains an imidazole compound selected from the group consisting of

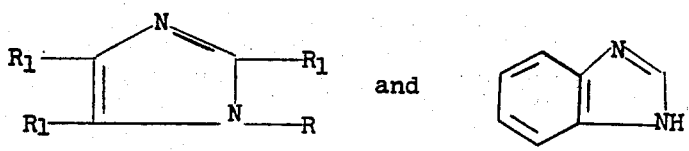

wherein R is selected from the group consisting of hydrogen, alkyl having 1 to 18 carbon atoms, alkenyl having 2 to 18 carbon atoms, cycloalkyl having 5 to 7 carbon atoms and phenyl, and R₁ is selected from the group consisting of R and chlorine, and acid addition salts thereof with a weak acid.

Examples of such substituents include alkyl having 1 to 18 carbon atoms such as methyl, propyl, butyl, dodecyl, and hexadecyl. Further examples include aliphatic unsaturated radicals with double bonds, such as alkenyl having 2 to 18 carbon atoms, for example vinyl, alkyl or oleyl. Other suitable substituents include cycloalkyl of 5 to 7 carbon atoms such as cyclohexyl as well as mononuclear aromatic hydrocarbons such as phenyl. These above-mentioned substituents are positioned preferably on one of the two nitrogen atoms.

Besides the nitrogen, one or more of the carbon atoms may be substituted by these above-mentioned radicals. It is also possible to substitute chlorine on the carbon atoms. Suitable compounds for the purpose of the invention are, for example 2-methyl imidazole, 2-cyclohexyl-4-methyl imidazole, 4-butyl-5-ethyl imidazole, 2,5-dichloro-4-ethyl imidazole. If the imidazoles or the benzimidazole are used as salts of weak acids, especially the organic acids enter into consideration as the salt formers, or also weak inorganic acids such as phosphoric acid or sulfurous acid. Accordingly the formates, acetates, benzoates, octoates, laurates, phosphates and sulfites of the imidazoles or benzimidazoles may be used.

Possible as basic stabilizers are metal compounds as recommended for the production of PVC plastisols or organisols or for the processing of PVC compositions. These involve, for example, basic zinc compounds such as zinc oxide or compounds which are available on the market in the form of barium zinc complexes. Likewise to be considered are barium cadmium complexes as well as dibutyltin dilaurate. In the present case, lead stabilizers such as basic complexes of lead stearate or else basic lead sulfite or lead sulfate have proved especially satisfactory. Particularly preferred are the dibasic lead phosphite or lead phthalate. Good results are also obtained with the tribasic lead maleate or the tetrabasic lead fumarate or lead salicylate. In addition to the above-mentioned stabilizers, further known stabilizer additives to be considered are triphenyl phosphite, trilauryl phosphite or others. These further known stabilizers are, however, additionally used and are not to be considered a part of the content of basic metal compounds to be used according to invention.

Lastly the plastisols according to the invention should contain epoxidized plasticizers. These compounds in themselves are known for the production of PVC compositions or PVC plastisols. Besides producing a plasticizing effect, they simultaneously provide stability on heating. Suitable examples of epoxide plasticizers include epoxidized soya bean oil, epoxidized linseed oil or the 2-ethylhexyl ester of epoxidized soybean fatty acid or epoxidized butyl oleate or epoxidized octyl oleate.

The plastisols of the invention additionally contain known plasticizers. Examples include the monoester and the diesters of phthalic acid with alkanols having 1 to 18 carbon atoms or with cycloalkanols having 5 to 7 carbon atoms such as dibutyl phthalate, dicyclohexyl phthalate, di-methylcyclohexyl phthalate, dioctyl phthalate, didecyl phthalate or mixed esters of phthalic acid with said alcohols such as octyl decyl phthalate. Also suitable as plasticizers are sulfonic acid esters of aromatic alcohol compounds, such as for example, octadecyl sulfonic acid ester of cresol or octadecyl sulfonic acid ester of phenol, but in particular technical mixtures of $C_{14}$ to $C_{16}$ alkyl sulfonic acid esters of cresols or phenol may be employed. Suitable also are phosphoric acid esters of aromatic alcohol compounds such as, tricresyl phosphate, or also phosphonic acid, adipic acid, sebacic acid esters of alcohols of medium chain length such as alkanols having 4 to 10 carbon atoms for example butanol, octanol and decanol. In some cases it is desirable if the plastisols contain in addition to the above-mentioned plasticizers the so-called polymeric plasticizers as produced by esterification of polyhydroxy alcohols with polycarboxyl carboxylic acids.

Generally, the plasticizer for polyvinyl chloride comprises from 6 to 60% by weight of the plastisol, with the proviso that the plasticizer component contains from 2 to 30% by weight of the plastisol of a plasticizer for polyvinyl chloride containing at least one vicinal epoxide group, wherein the ratio of the plasticizable polymer to the plasticizer for polyvinyl chloride is from 1:0.6 to 1:2.

The PVC plastisols contain from 10 to 50% by weight of a plasticiable polymer. Suitable as a base for the plastisols of the invention are all the known polyvinyl chloride types. They should have a K value of about 50 to 80. In addition to the PVC itself, examples of other suitable plasticizable polymers include copolymerizates of vinyl chloride with vinylidene chloride, or with esters of alkenoic acids having 3 to 6 carbon atoms and alkanol having 2 to 6 carbon atoms such as acrylic acid esters or methacrylic acid esters, with vinyl acetate and/or vinyl propionate, or with vinyl esters of higher fatty acids. Further there may be used in the polymerization small amounts of unsaturated carboxylic acids or their anhydrides. Suitable examples of such unsaturated carboxylic acids are for example alkenoic acids having 3 to 6 carbon atoms such as acrylic acid, methacrylic acid or crotonic acid; and alkenedioic acids having 4 to 6 carbon atoms such as maleic acid, itaconic acid or fumaric acid.

The polymer generally consists of polyvinyl chloride or copolymers of from 80 to 100% by weight of vinyl chloride and from 0 to 20% by weight of the above-mentioned ethylenically unsaturated monomers copolymerizable with vinyl chloride.

Furthermore the plastisols of the invention can preferably also contain from 0 to 70% by weight of auxiliary materials, such as mineral pigments or inorganic fillers. Suitable inorganic fillers are for example chalk, barium sulfate, talc, powdered alumina, dolomite and the like. Suitable mineral pigments are titanium oxide, iron oxide, cooper phthalocyanin, carbon black or the like. Suitable inorganic additives especially include the concomitant use of asbestos in an amount of about 0.1 to 2% by weight based upon the total amount of plastisol.

The plastisols of the invention can be applied in known manner onto the materials to be coated or to be bonded; and they can be caused to gel by heating to temperature of about 150° to 200°C. The heating time depends, of course, on the desired temperature and is between about 2 minutes up to a half hour. At a mean temperature of 160° to 170°C, a gelling time of 5 to 10 minutes is generally sufficient to obtain firm adhesion to steel plates, phosphatized steel plate and metals pretreated by electrocoating. Firmly adhering coatings can also be produced according to the invention on substrates which had previously been treated by conventional immersion techniques or by spraying procedures. Firmly adhering coatings can further be applied on various other substrates, in particular metallic materials, such as aluminum, chromium, vanadium, titanium, zinc as well as alloys of these metals or also ceramic parts, natural stones, concrete parts or also mineral fibers, such as glass fiber and the like.

The coatings produced with the plastisols according to the invention have the advantages of showing a firm adhesion on a variety of substrates. It is therefore generally not necessary to carry out an especially careful cleaning before applying these plastisols. Generally speaking, all materials which are coated with the plastisols of the invention can also be bonded with them. The only condition for coating or bonding is that they can withstand the temperature required for the gelling of the plastisol.

The following examples are merely illustrative of the present invention without being deemed limitative in any manner thereof.

EXAMPLE 1

In a kneader, a plastisol was prepared by mixing the following components:
230 gm polyvinyl chloride (K-value 70)
412 gm chalk
21 gm silica
50 gm di-methycyclohexyl phthalate
190 gm dioctyl phthalate
2 gm imidazole
5 gm dibasic lead phosphite
90 gm epoxidized linseed oil Plates of phosphatized steel and steel pretreated by electrocoating were coated with the plastisol prepared above. The plastisol was gelled for 5 minutes at 170°C (object temperature). Firmly adhering coatings were obtained, which could only be separated from the plate under material failure. Firmly adhering coatings were likewise produced on untreated steel plate after heating for 15 minutes at 170°C.

EXAMPLE 2

Using a procedure analogous to that described in Example 1, a plastisol was prepared to be identical to that in Example 1, except that 2 gm of benzimidazole was utilized instead of 2 gm of imidazole. Then coated articles were produced under the conditions described in Example 1, and practically the same result was achieved.

EXAMPLE 3

Using a procedure analogous to that described in Example 1, a plastisol was prepared to be identical to that in Example 1, except that 1 gm of imidazole was utilized instead of 2 gm of imidazole and except that 5 gm of asbestos fibers having a fiber length of 0.1 to 2 mm were added to the mixture. Then coated articles were produced under the conditions described in Example 1, except that the heat treatment time was 3 hours at 170°C. The results were practically unchanged.

EXAMPLE 4

In a kneader, a plastisol was prepared by mixing the followng components:
30 gm of a mixed polymerizate of 86% vinyl chloride and
14% vinylidene chloride (K-value 48)
120 gm of PVC (K-value 74)
412 gm of chalk
21 gm of silica
50 gm of di-methyl cyclohexyl phthalate
190 gm of dioctyl phthalate
2 gm of imidazole
5 gm of dibasic lead phosphite
90 gm of epoxidized linseed oil Plates of phosphatized steel, steel pretreated by electrocoating and brass were coated with the plastisol prepared above. The plastisol was gelled for 5 minutes at 170°C (object temperature). Firmly adhering coatings were obtained, which could only be separated from the plate under material failure.

Firmly adhering coatings were likewise produced on untreated steel plate after heating for 15 minutes at 170°C.

EXAMPLE 5

In a kneader, a plastisol was prepared by mixing the following components:

230 gm of polyvinyl chloride (K-value 70)
412 gm of chalk
21 gm of silica
50 gm of di-methycyclohexyl phthalate
190 gm of dioctyl phthalate
1 gm of imidazole
5 gm of asbestos fibers having a fiber length of 0.1 to 2 mm
5 gm of dibasic lead phosphite
40 gm of epoxidized linseed oil (8.0% epoxide oxygen)
60 gm of 2-ethylhexyl ester of epoxidized soybean fatty acid (5.8% epoxide oxygen).

Plates of untreated steel, phosphatized steel, brass, and steel pretreated by electrocoating were coated with the plastisol prepared above. The plastisol was gelled for 5 minutes at 170°C (object temperature). Firmly adhering coatings were obtained, which could only be separated from the plate under material failure. Although the present invention has been disclosed in connection with a few preferred embodiments thereof, variations and modifications may be resorted to those skilled in the art without departing from the principals of the new invention. All of these variations and modifications are considered to be within the true spirit and scope of the present invention as disclosed in the foregoing description and defined by the appended claims.

We claim:

1. A PVC plastisol comprising
A. from 10 to 50% by weight of a plasticizable polymer selected from the group consisting of polyvinyl chloride and copolymers of vinyl chloride with up to 20% by weight of ethylenically-unsaturated monomers copolymerizable with vinyl chloride,
B. from 6 to 60% by weight of a plasticizer for polyvinyl chloride, with the proviso that said plasticizer component contains from 2 to 30% by weight of the plastisol of a plasticizer for polyvinyl chloride containing at least one vicinal epoxide group, said plasticizer containing said at least one vicinal epoxide group being selected from the group consisting of epoxidized soy bean oil, epoxidized linseed oil, the 2-ethylhexyl ester of epoxidized octyl oleate and the mixtures thereof, wherein the ratio of component A to component B is from 1:0.6 to 1:2,
C. from 0.05 to 3.0% by weight of a member selected from the group consisting of imidazole, alkylated imidazole, chlorinated imidazole, benzimidazole, an acid addition salt of said imidazoles with a weak acid, an acid addition salt of benzimidazole with a weak acid, and the mixtures thereof,
D. from 0.2 to 5% by weight of a basic metal stabilizer compound, and
E. from 0 to 70% by weight of inert materials selected from the group consisting of inorganic fillers and mineral pigments.

2. The plastisol of claim 1, wherein there is from 0.1 to 1% by weight of said component (C).

3. The plastisol of claim 1, wherein there is from 0.3 to 2% by weight of said basic metal stabilizer compound of component (D).

4. The plastisol of claim 1, wherein there is from 5 to 20% by weight of said plasticizer containing at least one vicinal epoxide group of component (B).

5. The plastisol of claim 1, wherein said basic metal stabilizer compound of component (D) is selected from the group consisting of lead stabilizer compounds, zinc oxide stabilizer compounds and the mixtures thereof.

6. The plastisol of claim 1, wherein said member of component (C) is a imidazole compound selected from the group consisting of

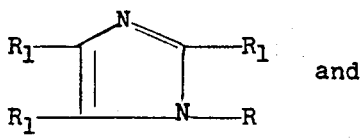 and 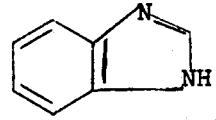

werein R is selected from the group consisting of hydrogen, alkyl having 1 to 18 carbon atoms, alkenyl having 2 to 18 carbon atoms, cycloalkyl having 5 to 7 carbon atoms and phenyl, and $R_1$ is selected from the group consisting of R and chlorine, and acid addition salts thereof with a weak acid.

7. The plastisol of claim 1,
wherein in (B), said plasticizer containing said at least one vicinal epoxide group is selected from the group consisting of epoxidized linseed oil, 2-ethylhexyl ester of epoxidized soybean fatty acid and the mixtures thereof,
wherein in (C), said member is selected from the group consisting of imidazole and benzimidazole, and
wherein in (D), said basic metal stabilizer compound is dibasic lead phosphite.

8. In a PVC plastisol comprising
A. a plasticizable polymer selected from the group consisting of polyvinyl chloride and copolymers of vinyl chloride with up to 20% by weight of ethylenically-unsaturated monomers copolymerizable with vinyl chloride,
B. an effective amount of a plasticizer for polyvinyl chloride, and optionally
C. inert materials selected from the group consisting of inorganic fillers and mineral pigments; the improvement which comprises utilizing in (B) as said effective amount of a plasticizer for polyvinyl chloride, from 6 to 60% by weight of a plasticizer for polyvinyl chloride, with the proviso that said plasticizer component contains from 2 to 30% by weight of the plastisol of a plasticizer for polyvinyl chloride containing at least one vicinal epoxide group, said plasticizer containing said at least one vicinal epoxide group being selected from the group consisting of epoxidized soy bean oil, epoxidized linseed oil, the 2-ethylhexyl ester of epoxidized soybean fatty acid, epoxidized butyl oleate, epoxidized octyl oleate, and the mixtures thereof, wherein the ratio of component A to component B is from 1:0.6 to 1:2; further in combination with
D. from 0.05% to 3.0% by weight of a member selected from the group consisting of imidazole, alkylated imidazoles, chlorinated imidazoles, benzimidazole, an acid addition salt of said imidazoles with a weak acid, an acid addition salt of benzimidazole with a weak acid, and the mixtures thereof, and
E from 0.2 to 5% by weight of a basic metal stabilizer compound.

* * * * *

UNITED STATES PATENT OFFICE
CERTIFICATE OF CORRECTION

Patent No. 3,917,550          Dated November 4, 1975

Inventor(s) Wilhelm Clas and Helmut Horst Korte

It is certified that error appears in the above-identified patent and that said Letters Patent are hereby corrected as shown below:

IN THE PATENT

| Column | Line | |
|---|---|---|
| 5 | 32 | "cooper" should be -- copper --. |
| 7 | 50 | After "ester of", the phrase --epoxidized soybean fatty acid, epoxidized butyl oleate-- has been omitted from the claim. |

Signed and Sealed this first Day of June 1976

[SEAL]

Attest:

RUTH C. MASON  
Attesting Officer

C. MARSHALL DANN  
Commissioner of Patents and Trademarks